United States Patent
Tieu et al.

(10) Patent No.: US 6,491,510 B1
(45) Date of Patent: Dec. 10, 2002

(54) ADJUSTABLE FLOW CHANNEL FOR AN EXTRUDER HEAD

(75) Inventors: Hao Anh Tieu, Akron, OH (US); Carl Trevor Ross Pulford, Cuyahoga Falls, OH (US); Bruce Joseph Turner, Wadsworth, OH (US); Ernest Wilford Looman, Jr., Tallmadge, OH (US); George Samuel Fielding-Russell, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 124 days.

(21) Appl. No.: 09/658,086

(22) Filed: Sep. 8, 2000

(51) Int. Cl.$^7$ ................................................ B29C 47/92
(52) U.S. Cl. ................ 425/145; 425/382 R; 425/382.4; 425/461; 425/464
(58) Field of Search .............................. 425/145, 382.4, 425/382 R, 461, 464

(56) References Cited

U.S. PATENT DOCUMENTS

| | | | |
|---|---|---|---|
| 2,734,224 A | * 2/1956 | Winstead | ..................... 425/461 |
| 3,268,950 A | 8/1966 | Rankin | |
| 3,292,211 A | 12/1966 | Strange | |
| 3,357,050 A | 12/1967 | Criss | |
| 3,382,537 A | 5/1968 | Tigner | |
| 3,551,951 A | 1/1971 | Schiesser | |
| 3,825,645 A | 7/1974 | Fayet | |
| 4,017,240 A | * 4/1977 | Nelson | ....................... 425/461 |
| 4,281,980 A | 8/1981 | Hoagland et al. | ........... 425/461 |
| 4,395,217 A | 7/1983 | Benadi | .................... 425/382 R |
| 4,439,125 A | 3/1984 | Dieckmann et al. | ........ 425/140 |
| 4,470,790 A | 9/1984 | Harada et al. | .......... 425/192 R |
| 4,690,628 A | 9/1987 | Dehennau et al. | ........ 425/133.5 |
| 4,944,666 A | 7/1990 | Hilke et al. | .............. 425/131.1 |
| 4,990,293 A | * 2/1991 | Macosko et al. | ......... 425/382.4 |
| 5,147,195 A | 9/1992 | Cloeren | ................... 425/133.5 |
| 5,522,719 A | * 6/1996 | Umeda et al. | ........... 425/382.4 |
| 5,616,350 A | * 4/1997 | Wissman et al. | ........... 425/145 |

FOREIGN PATENT DOCUMENTS

| | | |
|---|---|---|
| DE | 3448026 | 3/1986 |
| FR | 2130986 | 11/1972 |
| GB | 2016355 | 9/1979 |
| JP | 66008455 | 5/1966 |
| JP | 53121059 | 10/1978 |
| JP | 56129137 | 10/1981 |
| JP | 5736624 A | 2/1982 |

OTHER PUBLICATIONS

Modern Plastics, Aug. 1983, Engineering & Processing News—pp. 22, 24, and 26.

* cited by examiner

Primary Examiner—Jan H. Silbaugh
Assistant Examiner—Joseph Leyson
(74) Attorney, Agent, or Firm—David L. King

(57) ABSTRACT

An extruder apparatus has an extruder flow channel 10 for an extruder head having a pair of flow passages 40, 50 and a flow dam 12 interposed between the flow passages and a flow splitter 14 that locally increases or locally decreases the flow area of the first flow passage 40 relative to the second flow passage 50. The preferred flow channel 10 adjusts the mass balance of the flows 6, 7 between passages 40, 50 automatically.

6 Claims, 7 Drawing Sheets

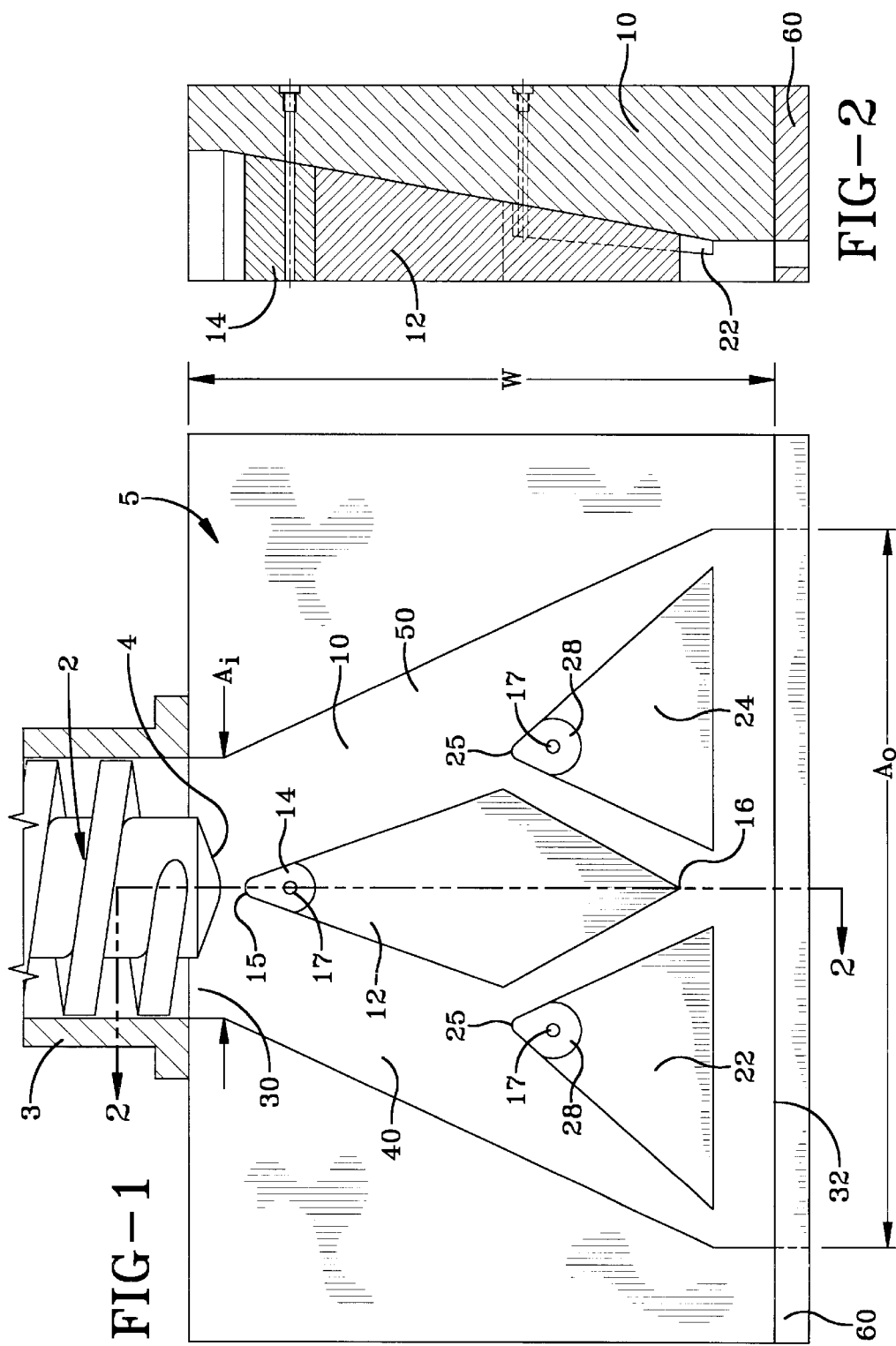

ADJUSTABLE FLOW CHANNEL FOR AN EXTRUDER HEAD

TECHNICAL FIELD

This invention relates to an apparatus for directing the flow of elastomeric material through an extruder head.

BACKGROUND OF THE INVENTION

In the art of extruding strips of material whether they be plastic or elastomeric, the use of an extruder having a heated barrel and a screw that provides shear energy to the material to be plasticized is well known. As the material is heated it generally converts from a solid pellet or strip form into a strip of plasticized material at the end of the screw tip that projects the material into an extruder head. This extruder head generally has a flow channel comprised of one or more passages or channels that direct the plasticized material through the extruder head to an outlet or discharge die that forms the material into the proper predetermined cross-sectional profile.

Oftentimes the extruder system is of a complex nature providing two or more dissimilar materials to be coextruded. In one example a duplex tread can be made with a top cap material and a lower base material, each material being specifically designed for its application. In even more complex applications, a triplex extruder can be used in which the cap material and base material also have on each lateral extreme a sidewall material that is simultaneously coextruded and bonded to the other two components. All of these materials are projected into an extruder head that directs the materials into a flow channel which assembles and bonds them so that they come out as one or more solid singular pieces. Oftentimes it is desirable to provide adjustable flow restricting members within these channels such that the proper amount of material is provided throughout the extrudate. Such a mechanism is described in U.S. Pat. No. 5,147,195. In that patent they indicate a difficulty exists when converging streams of dissimilar rheological properties that is, for instance of dissimilar viscosities and elasticities. For example, when a melt stream has a high resistance to flow relative to a melt stream which is to be converged, it may be advantageous to provide a heavy edge flow of the high resistant melt stream prior to the convergence by using a suitable contoured stream contacting surface. Similarly, it may be advantageous in other situations to provide a heavy centerflow of one of the melt streams prior to the convergence.

In U.S. Pat. No. 5,147,195, the invention is directed to providing a unique extrusion apparatus that includes a first flow channel and a second flow channel that are separated by a divider member and which converge. A preferred feature of the apparatus is a segmented, flow restricting member that provides an adjustable stream contacting surface. The segmented flow restricting member has a face portion that cooperate within opposing wall of the divider member to form an output gap of one of the flow channels, an adjustment assembly is operatively in communication with the flow restricting member and is employed to adjust the gap. These flow restricting members simply shut off a portion of the flow channel that the plasticized material is passing through, such that a volumetric change can occur in one channel or the other. While these techniques provide an adjustment capability with dissimilar materials such as is common in multi-material components they provide no means for providing a balanced flow of material when it is a homogeneous material. This is particularly troublesome when elastomeric materials are processed. In that case, the material flow is such that as the rubber passes through the flow channel different flow velocities are created across the cross-section of the channel which will result in a mass unbalance in the as-extruded profile of the component as it comes out of the extruder die. What generally happens is that one side of the die will have the material coming out and swelling to a larger area because it has a higher velocity flow rate than the material on the opposite side of the die.

A further problem arises in the simultaneous extrusion of multiple profiles from the same extruder. In this case, it is generally found that the mass output of each profile is not the same, even though the die for each profile is identical. This imbalance of flow between multiple cavities is related to the flow channel, and the amount of imbalance depends on the rheological properties of the elastomeric material, the temperature distribution in the flow channel and flow channel design. Furthermore, the amount of imbalance varies somewhat when the type of material being extruded is changed and also when unavoidable variations in extruder operating conditions occur, such as fluctuations in temperature distribution. In the art, tool makers have to vary the shape and cross-section of the flow channel to obtain equal outputs of each profile. This requires repetitive machining of the flow channel and once done for one particular elastomer material, cannot be adjusted when other types of elastomers are extruded or fluctuations in extruder operating conditions occur.

In order to compensate for these variations in flow velocities within an extruder head, there has been developed a flow channel. The flow channel of an extruder is that portion of the extruder immediately downstream of the screw tip and immediately upstream of the die for forming the profile for the extruded component. These flow channels are specifically designed to insure that uniform flow of material occurs and that the distribution of the material is generally uniform across the flow channel as the material approaches the die. In order to achieve this the toolmaker often times has to vary the shape and cross-section of the flow channel to insure that the velocity profiles approach the die in as uniform a fashion as possible. Once the flow velocities are optimized so that they are generally uniform across the face of the die, the flow channel is said to be balanced for that particular material. In practice, this requires multiple machinings of flow channels and adjustments of dies in order to achieve this balanced flow. These dies are somewhat dependent on the material being extruded, its basic rheological properties, its temperature and the velocity at which the material is being extruded. All of these engineering factors means that a tremendous amount of tuning is required to create a proper flow channel for a given material being extruded and die construction.

A secondary problem that also relates to the mass and velocity imbalance across the die is the unwanted curvature of the extrudate after it leaves the die, such that instead of obtaining a straight strip, a "banana"-shaped curved strip is obtained. This problem is also somewhat related to the velocity distribution in the material as it flows through the flow channel. If one can visualize an extrudate coming out of a die and it was a flat sheet, the material along the lateral edges of the die may be moving at different velocities such that one side of the extruded material will tend to bow or bend as the other side is moving at a faster velocity, the slower side tending to stay close to the die while the faster moving part is moving quicker away from the die. The resulting effect is a "banana" shaped curvature of the profiled component. This curvature as the component is formed is an indication that the velocities of the material are dissimilar from one side of the die to the other even though the dimensional characteristics of the profile component may seem accurate. This non-uniform velocity change causes the component to have a natural bow. In the preparation of tire treads for example, this effect can have some detrimental effect on the product quality of the resultant tire since the accuracy with which the tread can be applied to the unvulcanized tire is reduced and an asymmetry in the molded tire, called conicity, can be created. It is, therefore, an object of the present invention to provide a flow channel that provides a simple way of balancing the flow between multiple cavities and within each cavity so that the proper mass balance of the formed component is achieved. It is also an objective of the present invention to provide an adjustable means to compensate for mass variation and conicity variation within a profiled component. While these features are somewhat related, each can be provided in separate flow channels or can be used in combination to achieve a proper flow channel for the formation of elastomeric strips. In one application of the invention, the entire inventive concept is directed to an adjustable mass balance feature provided within a flow channel. In the second related application, the flow channel is provided with an adjustable conicity weir for insuring that the profile component is provided in such a fashion that the flow velocities do not create any conicity imbalances. While each of these features may be used separately within a flow channel and have separate utility in and of themselves, it is believed preferable that they be used in combination for an optimal result. In the present application, the mass balance feature will be described in detail with the conicity weir feature being provided in a separate, but related application filed simultaneously with the present application.

Where the present invention works well in balancing and providing improved conicity of an extruded strip of elastomeric material coming out of a die with a single opening, it has been noted that these features are most beneficial when multiple components are produced from a single die having multiple openings for producing two or more strips of material. In these cases it will be easily appreciated that mass balancing and conicity problems are exaggerated because the flow is divided within the flow channel creating two separate flow streams that in order to produce equal or duplicate products must have the balance matched perfectly and the conicity adjusted to insure that flow velocities are uniform or as uniform as possible through each of the die openings forming the strips.

These objectives are achieved by the invention as described below.

SUMMARY OF THE INVENTION

An extruder apparatus has an extruder flow channel for an extruder head forming simultaneously one or more elastomeric strips of predetermined cross-sectional profiles is described. The extruder flow channel has a flow inlet end of a predetermined cross-sectional area $A_i$ and a first and a second flow passage communicating with the flow inlet end and each passage having a flow outlet end of a predetermined cross-sectional area $A_o$ and a flow dam interposed between and separating the first flow passage and the second flow passage. The flow dam has a flow splitter. The flow splitter locally increases or locally decreases the flow area of the first flow passage relative to the flow area of the second flow passage. It will be understood by those versed in the art that more than two extrudates can be made simultaneously by extending the concept as follows: Four extrudates, for example, may be made by a flow channel in which each of the two passages described above is subdivided by dams having flow splitters to create four separate passages.

Returning to the example with two flow passages, in use, the flow splitter is asymmetrically oriented relative to the flow inlet end. This asymmetric orientation effects a difference in mass flow of the elastomeric strip in the first channel relative to the second channel. Preferably the extruder flow channel has a mass flow sensor in each first and second flow passage or on each elastomeric strip.

Most preferably the extruder head flow channel has a flow splitter adjustment mechanism attached to the flow splitter. The flow splitter adjustment mechanism moves the flow splitter during the operation of the extruder to effect a relative change in the flow area of the first flow channel relative to the flow area of the second flow channel. The extruder flow channel preferably has the mass flow sensor in each first and second flow channel, a logic circuit connected to the sensors to measure the difference in mass flow and to calculate the amount and direction the mass flow splitter must move to equalize flow, a means for signaling the amount of flow splitter adjustment, an actuator for moving the flow splitter adjustment mechanism by a predetermined amount requested by the means for signaling. Preferably, the mass flow sensors are located down stream of the mass flow splitter. Additionally, the mass flow sensors signal total mass flow values in each channel to the logic circuit which can calculate the total mass flow to a means for signaling the extruder to increase or decrease extrudate flow. In this way, not only can mass flow differences between the first and second channels be detected, but also the delivery amount of extrudate can be adjusted.

In the preferred embodiment the mass flow splitter has a substantially triangular cross-section having an apex. The apex is in proximity to the flow inlet end, preferably in very close proximity to the flow inlet end. The mass flow splitter is preferably pivotally movable relative to the dam.

In the preferred embodiment each first and second flow passage tapers inwardly in one direction and widens in another direction below the inlet end to the outlet end forming a substantially trapezoidal portion adjacent the outlet end. In each of the trapezoidal portions, there is included a flow weir in each flow passage. In an example, the weir has a substantially triangular shape extending to a height less than the full depth of the channel. Preferably the weirs height reaches a peak of at least 50% of the flow channel depth and is provided to effect a redistribution of the elastomeric flows mass prior to entering the final shaping die of the extruder head.

BRIEF DESCRIPTION OF THE DRAWINGS

FIG. 1 shows a top plan view of the extruder flow channel connected to an extruder on the upstream side of the material flow and to a profiling die on the downstream side of the channel flow.

FIG. 2 is an end view of the cross-section taken from FIG. 1 along lines 2—2.

DETAILED DESCRIPTION OF THE INVENTION

Figure 7:
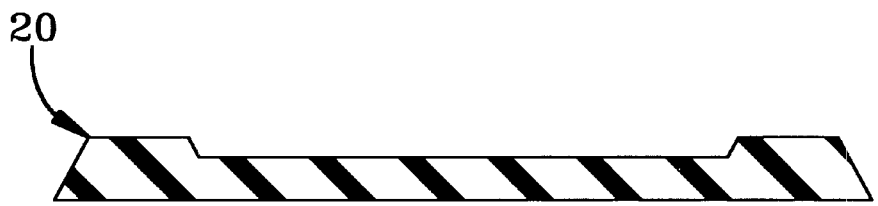
FIG. 7 is a cross-sectional view of an elastomeric strip.

With reference to FIGS. 1 and 2 an extruder is commonly known in the art and not illustrated has an extruder screw 2 having an extruder tip 4 enclosed in an extruder barrel 3. Attached to the extruder barrel is an extruder head 5. The extruder head includes a flow channel 10 which has an inlet end 30 for accepting plasticized material preferably elastomeric material and an outlet end 32 for discharging the plasticized material through a die for forming the profile of the elastomeric strip to be produced. This die is commonly referred to as a profile die 60 while the elastomeric strip is item 20 as illustrated in FIG. 7.

Figure 3:
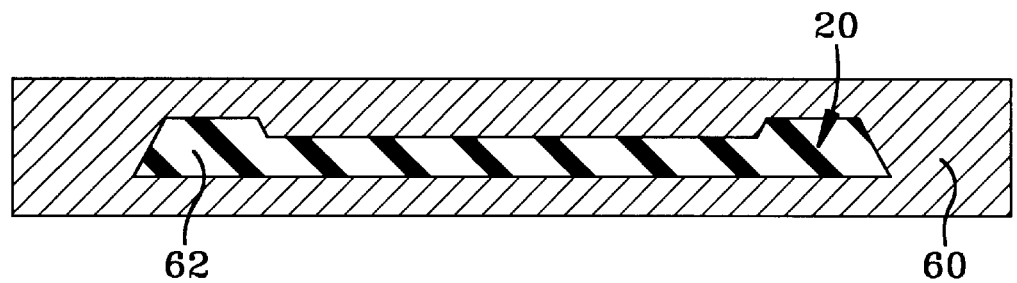
FIG. 3 is an exemplary finished die forming an elastomeric strip having a single opening.
Figure 4:
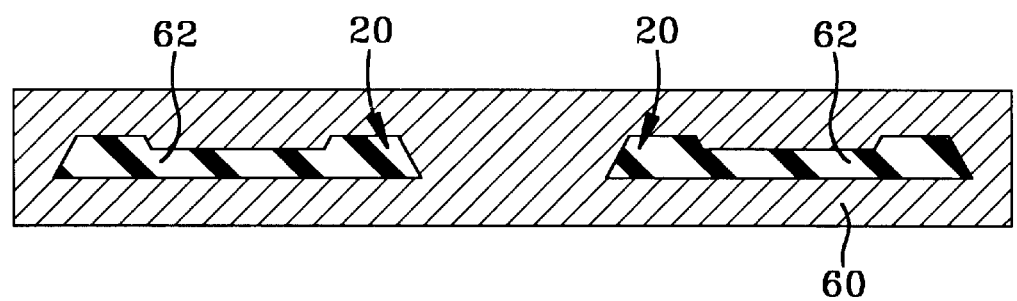
FIG. 4 is an exemplary die having two profile openings forming two elastomeric strips of similar cross-sectional profile.

Between the inlet end 30 and the outlet end 32 of the flow channel 10, there are first and second flow passages 40, 50 respectively. Interposed between the first and second flow passages 40, 50, is a flow dam 12. The flow dam 12 separates the first flow passage 40 from the second flow passage 50. At the very tip of the flow dam is a mass flow splitter 14. As shown, the mass flow splitter has an apex 15. As illustrated the mass flow splitter has a substantially triangular shape with the apex 15 being in the "neutral" position symmetrically oriented relative to the flow inlet end 30. The flow splitter locally increases or locally decreases the flow area of the first flow passage 40 relative to the flow area of the second flow passage 50 by being asymmetrically oriented relative to the flow inlet end 30. This asymmetric positioning of the flow splitter 14 relative to the mass flow insures that the rubber as it flows from the inlet area $A_i$ is redistributed volumetrically. This asymmetric positioning of the apex of the mass flow splitter 14 restricts one of the flow passages 40, 50 more than the other flow passages 40, 50 thus creating a localized back pressure that redistributes the mass of the rubber on each of the first and second flow channels. By properly selecting the amount of shift in the apex 15 of the flow splitter 14 relative to the inlet cross-sectional area $A_i$, one is able to effectively balance the amount of rubber mass flowing through each passage 40, 50 so that they are approximately equal in pounds mass of rubber being transferred through each flow passage 40, 50. While this feature is beneficial in producing a single elastomeric strip 20 from a profile die 60 as illustrated in FIG. 3, it is even more beneficial in producing multiple strips 20 from a single die 60 as illustrated in FIG. 4, wherein the die has two openings 62 for forming two strips simultaneously, one being formed from each flow passage 40, 50 as the rubber mass is being distributed through the flow passages and the profile die 60. As the dam 12 extends towards the outlet end 32 of the flow channel 10, it converges back to a discharge apex 16 as illustrated. As can be seen in FIG. 2, the dam 12 and the channels 40, 50 taper inwardly. The passages 40, 50 elongate laterally so as to flatten the cross-sectional area as the elastomeric flow approaches the discharge end 32 of the flow channel 10 and prior to entering into the extruder profile die 60. Although not required, the dam 12 can extend almost the full length W of the flow channel 10 creating a blockage and completely separating the first flow passage 40 from the second flow passage 50 at the discharge end 32.

Figure 5A:
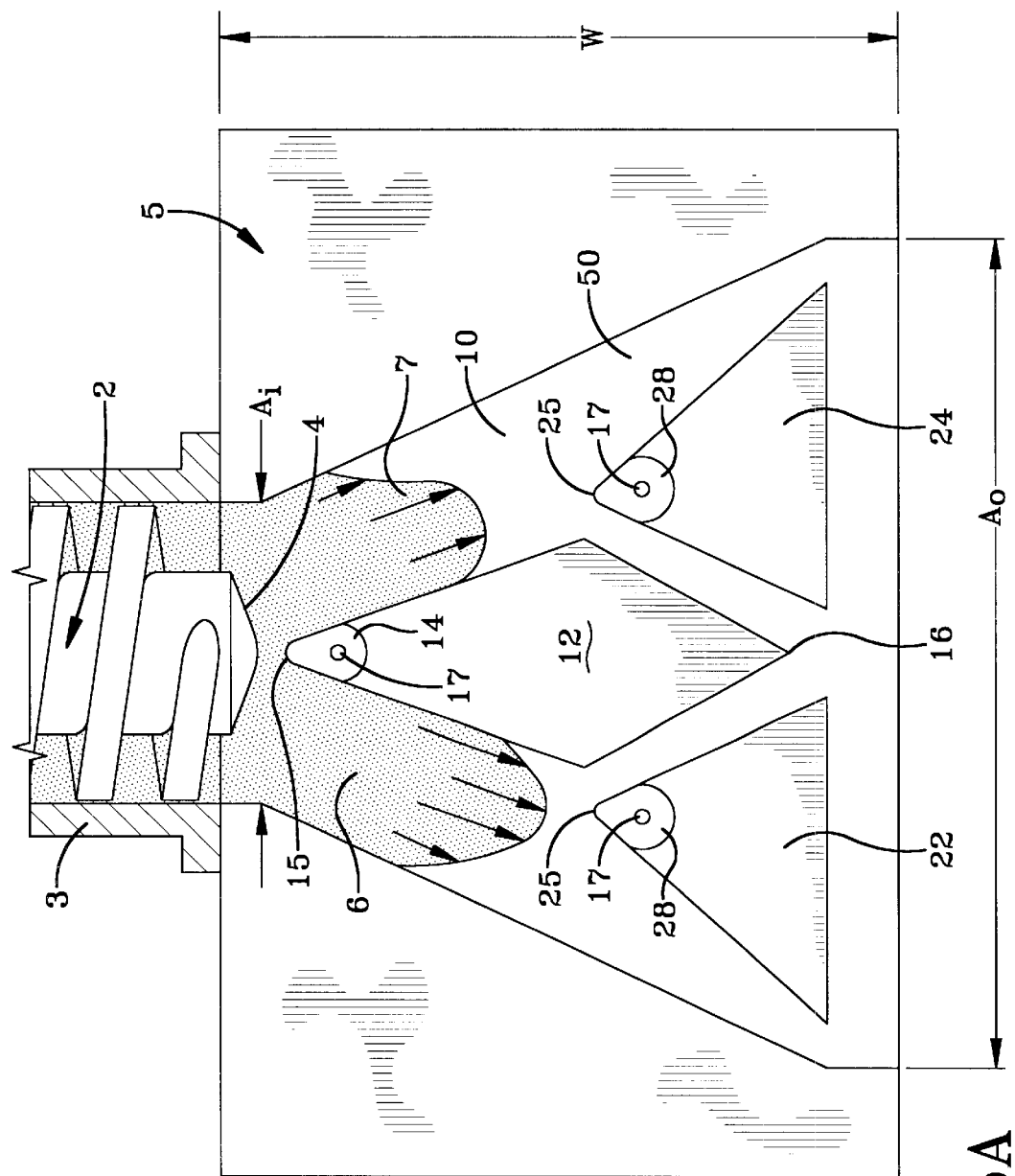
FIG. 5A shows an improperly balanced flow channel.
Figure 5B:
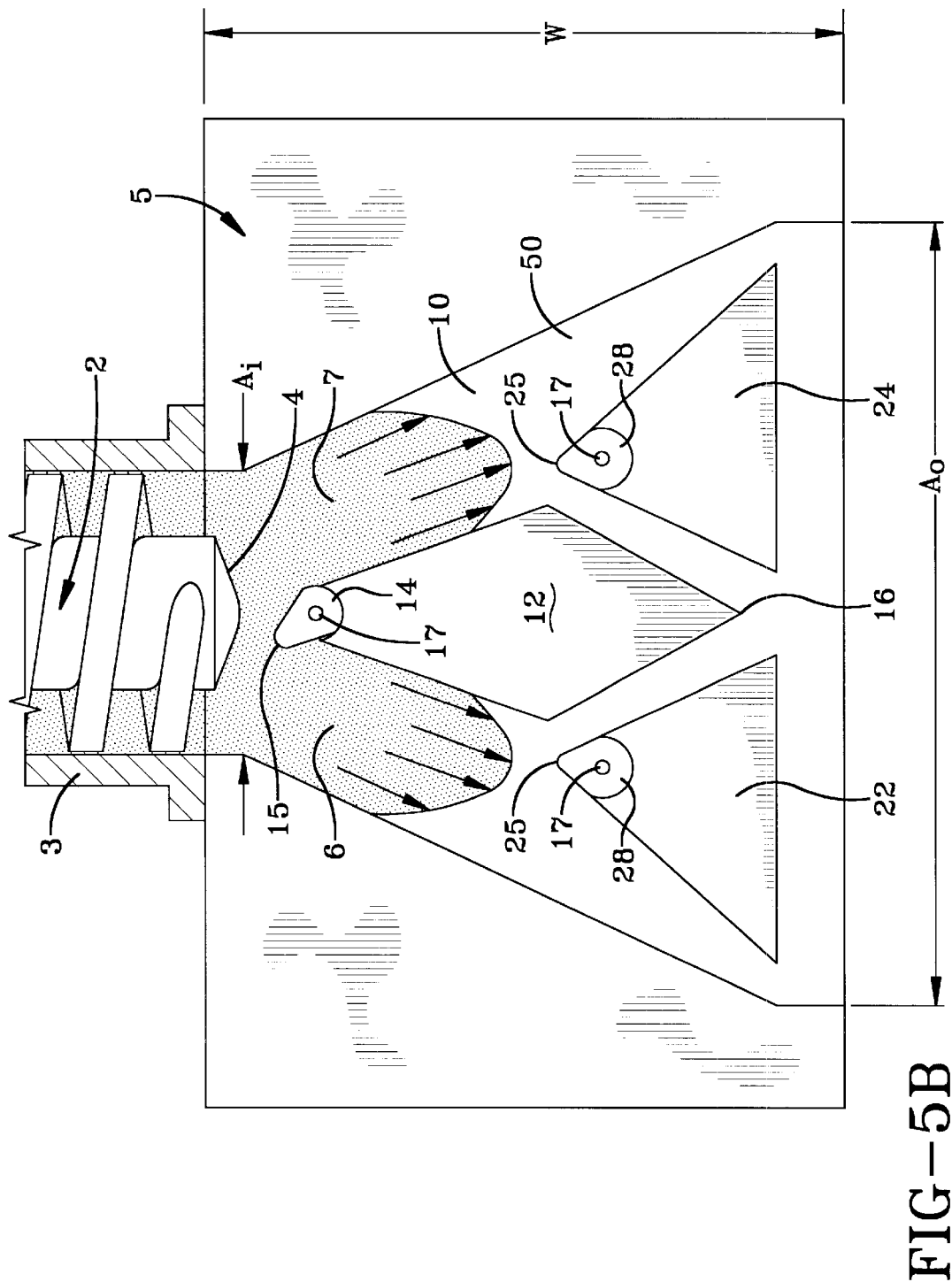
FIG. 5B shows the ideal flow velocity balance obtained by adjusting the flow splitter.

With reference to FIGS. 5A and 5B, the flow velocity vector profile in the flow channel 10 is shown in an unbalanced condition, with the faster flow occurring in passage 40 in this example FIG. 5A. A certain unbalance is typical in a symmetric flow channel design. This unbalanced condition can be eliminated by orienting the flow splitter 14 to reduce the flow area in the passage experiencing faster flow. In the example shown in FIG. 5A, the condition is corrected by orienting the apex of the flow splitter onto passage 40, as shown in FIG. 5B.

At the discharge end 32 of the flow channel 10, there is illustrated in FIG. 1 a first flow weir 22 in the first flow passage and a second flow weir 24 in the second flow passage 50. As illustrated, these flow weirs 22, 24 are asymmetrically positioned within the flow channel, each flow weir is substantially triangular in shape having an apex portion 25 at the leading end, the apex portion creating a mass flow diverter 28.

As shown in FIG. 5B as the elastomeric flow leaves the extruder barrel 3 and enters the inlet 30 of the flow channel 10, the mass flow is separated into two portions 6,7, each portion 6, 7 has a distinct velocity profile of the rubber as it is flowing through the flow passages 40, 50, respectively. As the rubber 20 impinges the flow weirs 22, 24 at the mass flow diverter 28 at the leading end of the weirs, the velocity profile is flattened with the objective being that the rubber as it enters the extruder die at the outlet end of the flow channel has a velocity profile that is substantially constant across the lateral length of the die. As illustrated in FIG. 2 each weir 22, 24 extends to a height that is less than the full depth of the passages 40, 50 at the location where the weirs 22, 24 are positioned. Preferably the weirs 22, 24 occupies 40 percent or more of the full depth of the flow passages 40, 50 in the area where the mass flow diverter is located.

It is believed important that the apex 25 of the weirs 22, 24 be positioned so that it impinges normal to the velocity profile of the flowing elastomeric strip 20 within each respective passage 40, 50. As shown, the material 20 impinges the flow weirs 22, 24 upon an angular flow and, therefore, it is believed important that the flow weirs 22, 24 be asymmetrically positioned to insure that they intercept at the maximum flow velocity within the flow channel as shown in FIG. 5B. If the flow channel 10 is provided such that velocity profile of the elastomeric flow in each flow passage 40 and 50 is symmetrical, then it is presumed that the flow weirs could be positioned symmetrically within the flow channel because in that construction the maximum flow velocity would be presumed to be at the midpoint of the flow passages 40, 50 or in close proximity thereto. As illustrated in FIG. 1, however, the flow is moving at a slight angular orientation to the die discharge end 32 and this means that the material mass of the rubber 20 closest to the dam 12 should be moving at a higher velocity because it has a shorter distance to travel to reach the discharge end 32. Accordingly, it is believed important for the apex of the flow diverter 28 to be located closer to the dam 12 at the point where the maximum flow velocity is occurring as illustrated in FIGS. 1 and 5. The mass flow splitter 14 is attached to the dam 12 and a mass flow diverter 28 attached to both the first weir 22 and the second weir 24. Each can be rigidly mounted and nonmovable relative to the flow path. This can be accomplished by fastening the flow splitter 14 and the mass flow diverters 28 directly to the flow channel 10. When this is done, the location of the apex 15, 25 or leading end of each component 12, 22, 24 must be preselected in a fashion to determine the optimal location. Assuming that the mass flow is not correctly balanced, or that there is a conicity problem with the formed strip 20, then an adjustment can be made to the angular orientation of the apex 15, 25 shifting it either slightly to one side or the other of the passages 40, 50, thereby opening or restricting the flow in the passages or diverting the flow at the weirs 22, 24. This method of adjusting and balancing the flows is done in an empirical fashion requiring an inventory of these components 14 and 28, each having different apex angles. Conicity or mass imbalance irregularities are corrected by exchanging components with those in the inventory. As one skilled in the art can easily appreciate this iterative process can be somewhat time consuming although preferable over the current art.

It is accordingly preferred, therefore, that the mass flow splitter 14 and the mass flow diverters 28 be movable within the channels 40, 50 as the material 20 is flowing. In this fashion, if these elements are pivotally movable relative to the channel then immediate adjustments can be made on a real time basis assuming adequate sensors and logic circuits are available to measure, analyze and request the necessary adjustment thereby restricting or opening the flow in the channels 40, 50 as it is needed to create the necessary balance or conicity adjustment.

Figure 8:
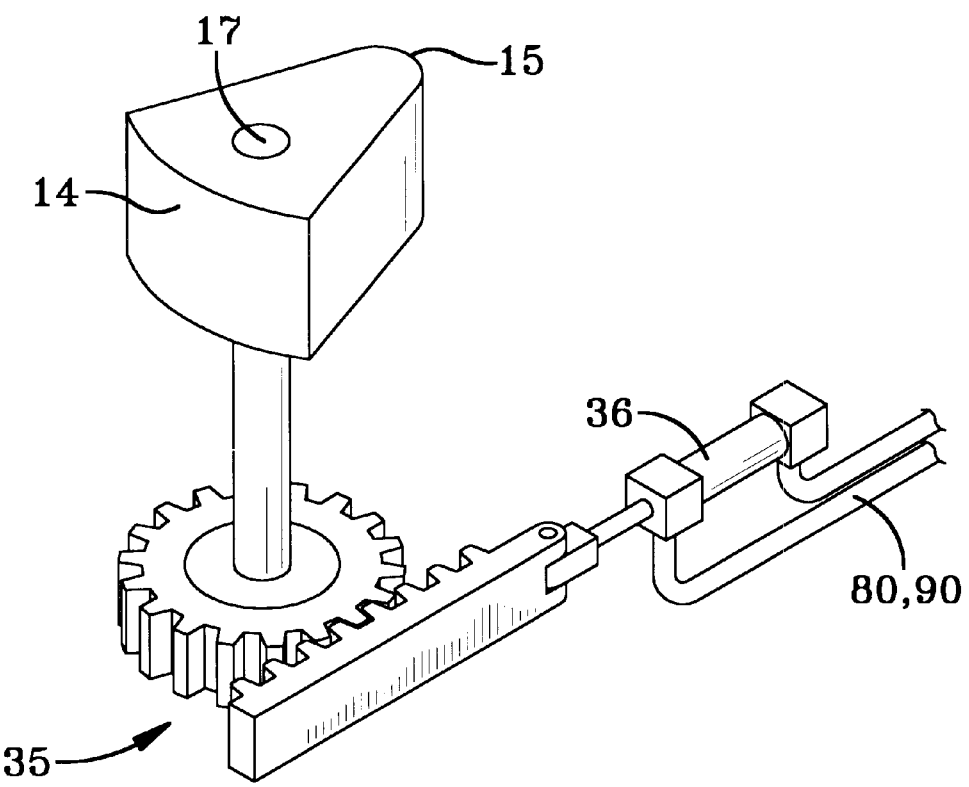
FIG. 8 is a cross-sectional view of the flow splitter adjustment mechanism.

The flow splitter adjustment mechanism 35 illustrated in FIG. 8 includes an actuator 36 which can move the flow splitter 14 about a pivot pin 17, thereby shifting the apex 15 relative to the inlet area $A_i$ and redirecting a portion of the flow 6, 7 in one side of the channel 40 or the other side of the channel 50 as need be. As illustrated, these are preferably achieved by providing a sensor means 80 in each flow channels 40, 50 that would measure the amount of mass flow 6, 7 being transferred through the flow channels 40, 50 and send a single back to a logic circuit 90 which would analyze the data and direct the actuator 36 to move the pivoted pin 17 a predetermined amount to adjust the apex 15 of the flow splitter 14 relative to the flow channels openings 40, 50.

Similarly the type of same mechanism will be used on the mass flow diverters 28 within each weir 22, 24, each would have a pivot pin 17, an actuator 36 and a mass flow adjustment mechanism 34 for enabling the mass flow diverter 28 to be pivotally rotated relative to the flow channels 40, 50 thereby adjusting the mass flow velocities to prevent any downstream conicity problems from occurring.

By providing this type of mechanism with internal sensing 80, it will enable the mass flow channels 40, 50 to be automatically adjusted in real time compensating for any variations within the extrudate flows 6, 7 as it is leaving the profile die 60. Additionally, it is believed desirable that the mass flow sensors 80 provide a signal back to the logic circuit 90 that would also communicate with the extruder mechanism 1 which could increase or decrease the amount of total mass flow being discharged at the inlet end 30 of the flow channel 10. In this way, the total mass can be varied as the extrudate being formed.

Alternatively, one could simply measure the profile of the extruded component strips 20 and weigh it as it is being formed in such a fashion to provide the necessary feed-back mechanism. This alternative way of measuring while fairly easy to accomplish does have some inherent lag times with regard to correcting conicity and mass imbalances, and, therefore, is considered to be somewhat less desirable then the real time measurements occurring within the flow channels 40, 50 themselves as illustrated.

Figure 6:
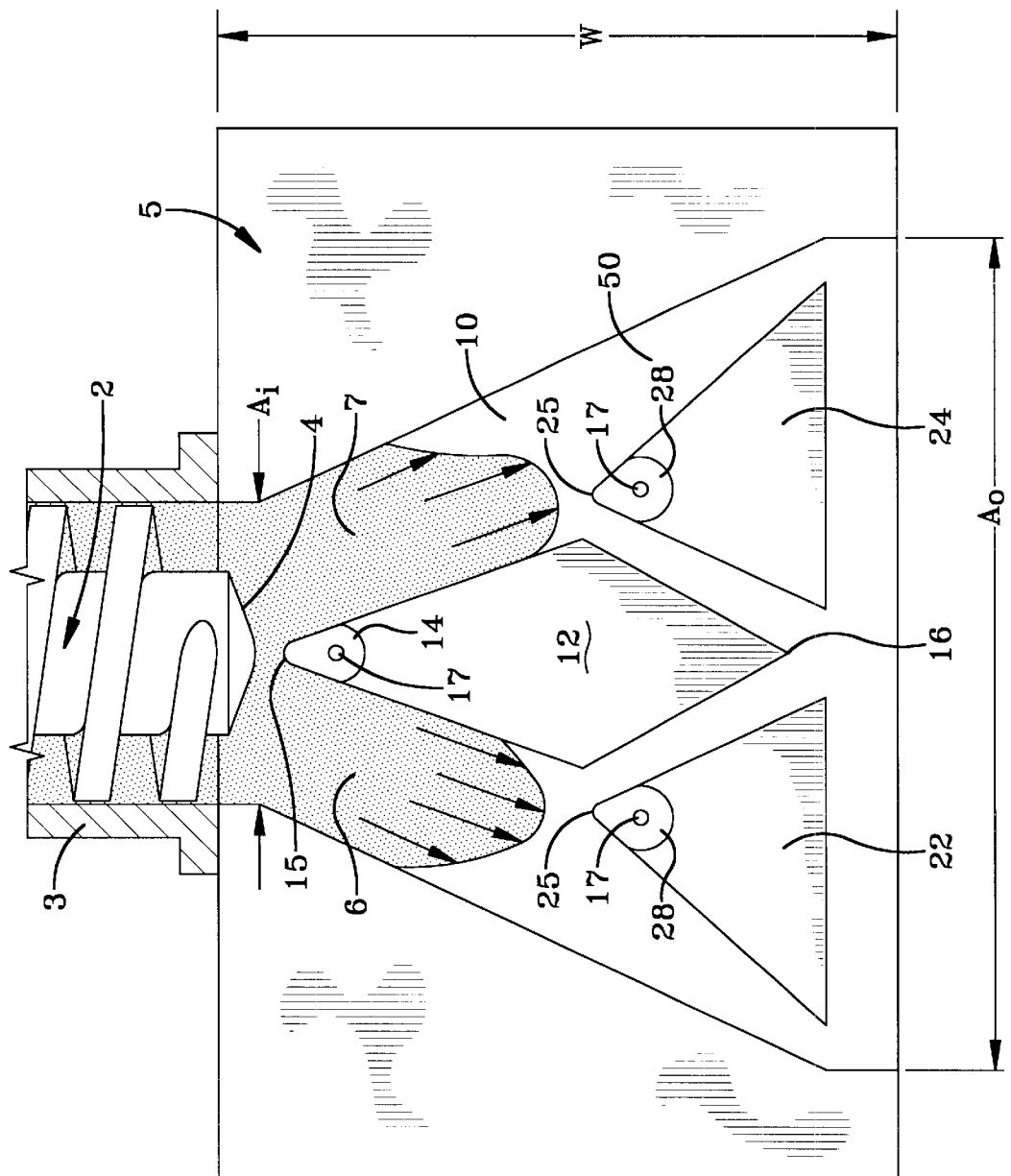
FIG. 6 shows the flow velocity prior to contacting the flow weirs.
Figure 6A:
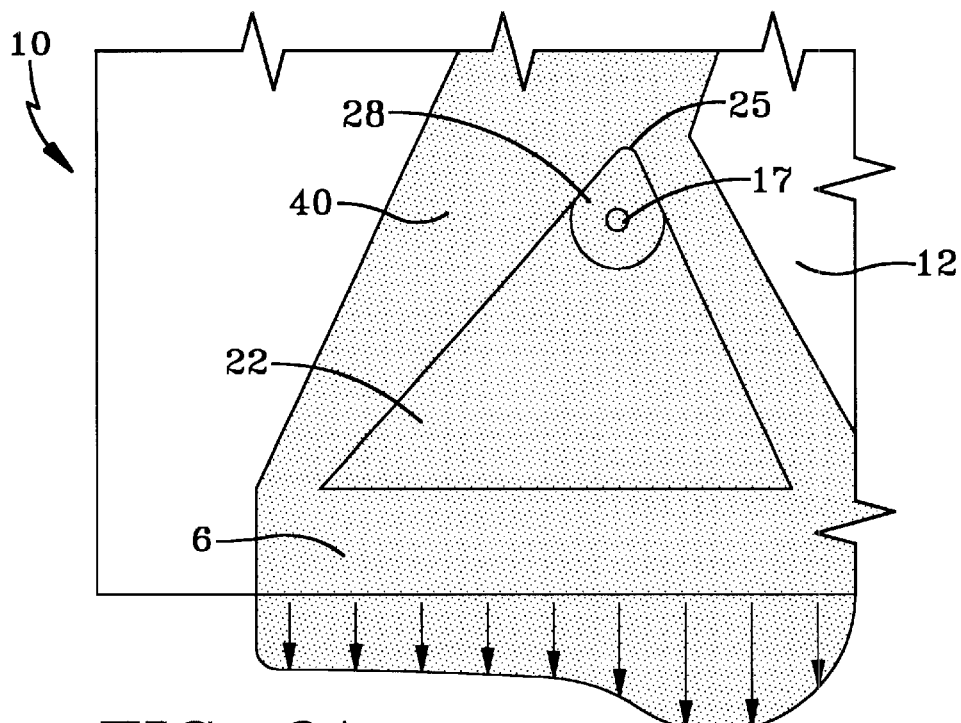
FIG. 6A shows an improperly balanced flow velocity of an extruded strip as it leaves the die.
Figure 6B:
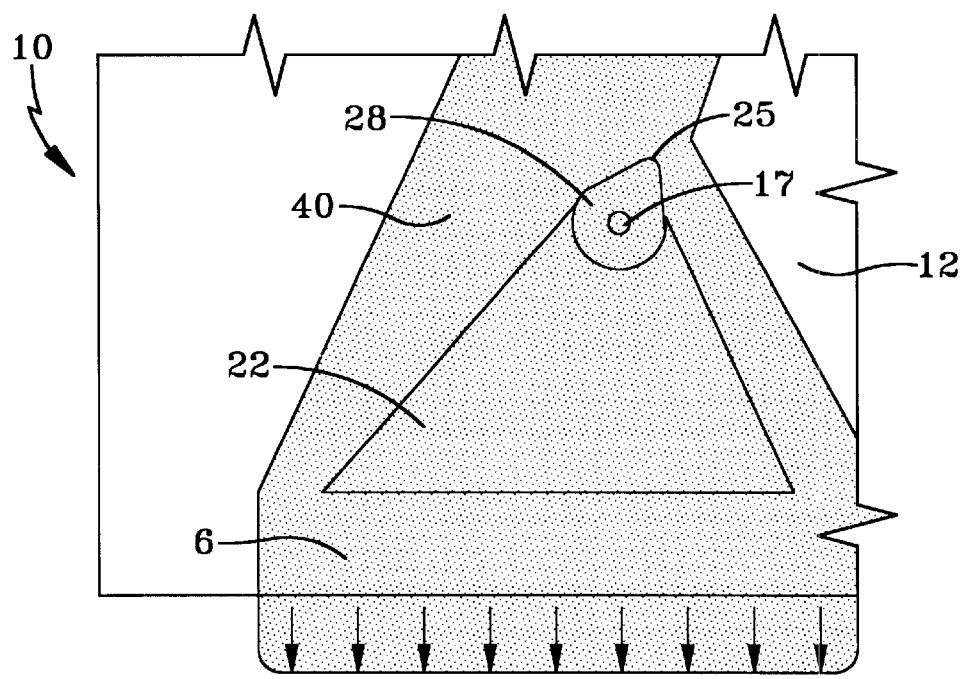
FIG. 6B is the ideal flow velocity of a formed component as it leaves the finished die.

With reference to FIGS. 6A and 6B, one will see that the flow weirs 22, 24 at the outlet end or discharge end 32 of the flow channels 40, 50 create a velocity vector profile of the elastomeric or rubber flows 6, 7. As illustrated in 6A, that profile shows an increased velocity closest to the dam 12. By pivoting the mass diverter 28 on the weir 22, there is a constriction in the flow closest to the dam 12. This constriction effectively slows the mass flow 6 close to the dam 12 and permits the velocity profile to flatten so that in the most preferred embodiment a uniform velocity vector profile is exhibited as the extrudate approaches the forming die 60.

What is claimed is:

1. An extrusion apparatus having an extruder flow channel for a extruder head forming simultaneously one or more elastomeric strips of predetermined cross-sectional profiles, the extruder flow channel comprising:

a flow inlet end of a predetermined cross-sectional area $A_i$;

a first and a second flow passage communicating with the flow inlet end and each passage having a flow outlet end of a predetermined cross-sectional area $A_a$;

a flow dam interposed between and separating the first flow passage and the second flow passage, the flow dam having a flow splitter end in proximity to the inlet end;

a pair of weirs, a first weir being located in the first flow passage in proximity to the first outlet end, a second weir being located in the second flow passage in proximity to the second outlet end, each first and second weir having a mass flow diverter at a leading end of the weir, wherein each mass flow diverter is movable relative to the flow path within the passage.

2. The extrusion apparatus of claim 1 wherein the mass flow diverter of each weir is oriented asymmetrically relative to the mass flow within each passage as measured relative to the direction of the mass flow.

3. The extrusion apparatus of claim 1 further comprising:

a mass flow diverter adjustment mechanism attached to the mass flow diverter, the mass flow diverter adjustment mechanism moves the mass flow diverter to effect a relative change in the flow area of the respective passage in proximity to the respective outlet end.

4. The extrusion apparatus of claim 3 further comprising a profile forming die attached to the outlet ends of the extruder flow channel, the profile forming die having two or more openings, said opening forming elastomeric strips of a predetermined cross-section.

5. The extrusion apparatus of claim 4 further comprising a sensor for measuring the conicity variation of the formed strip; a logic circuit to receive a signal from the sensor and to calculate the adjustment needed to eliminate the conicity variation at the mass flow diverter, an actuator for moving the mass flow diverter adjustment mechanism by a predetermined amount as calculated by the logic circuit.

6. The extrusion apparatus of claim 1, wherein the mass flow diverter of each weir is removable from the flow channel and interchangeable with other mass flow diverters having different apex angles, chosen from an inventory of mass flow diverters whose angles collectively cover a wide range.

* * * * *